United States Patent
Liu et al.

(10) Patent No.: US 11,588,145 B2
(45) Date of Patent: Feb. 21, 2023

(54) METHODS OF BRIQUETTING PRECURSOR MATERIALS FOR PRELITHIATED SILICON ACTIVE MATERIALS

(71) Applicant: GM GLOBAL TECHNOLOGY OPERATIONS LLC, Detroit, MI (US)

(72) Inventors: Zhongyi Liu, Troy, MI (US); Xiaosong Huang, Novi, MI (US); James R. Salvador, East Lansing, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 321 days.

(21) Appl. No.: 16/826,041

(22) Filed: Mar. 20, 2020

(65) Prior Publication Data
US 2021/0296633 A1    Sep. 23, 2021

(51) Int. Cl.
| | |
|---|---|
| *H01M 4/134* | (2010.01) |
| *B22F 3/03* | (2006.01) |
| *B22F 1/00* | (2022.01) |
| *H01M 4/04* | (2006.01) |
| *B22F 1/102* | (2022.01) |
| *H01M 4/02* | (2006.01) |

(52) U.S. Cl.
CPC ........... *H01M 4/134* (2013.01); *B22F 1/0007* (2013.01); *B22F 1/102* (2022.01); *B22F 3/03* (2013.01); *H01M 4/043* (2013.01); *B22F 2301/054* (2013.01); *H01M 2004/027* (2013.01)

(58) Field of Classification Search
CPC .............. H01M 4/134; H01M 4/043; H01M 2004/027; H01M 10/0525; H01M 4/0471; H01M 4/0483; H01M 4/405; H01M 4/623; H01M 4/622; H01M 4/1395; H01M 4/386; B22F 1/0007; B22F 1/102; B22F 3/03; B22F 2301/054; B22F 3/11; B22F 3/02; Y02E 60/10; C22C 1/05
See application file for complete search history.

(56) References Cited

U.S. PATENT DOCUMENTS

| | | |
|---|---|---|
| 8,440,350 B1 | 5/2013 | Verbrugge et al. |
| 8,859,144 B2 | 10/2014 | Xiao |
| 8,999,584 B2 | 4/2015 | Jiang et al. |
| (Continued) | | |

OTHER PUBLICATIONS

Halalay, Ion C. et al., U.S. Appl. No. 16/160,799, filed Oct. 15, 2018 entitled, "Method for Making Silicon-Containing Composite Electrodes for Lithium-Based Batteries," 47 pages.

(Continued)

*Primary Examiner* — Andrew J. Oyer
(74) *Attorney, Agent, or Firm* — Harness, Dickey & Pierce, P.L.C.

(57) ABSTRACT

A method of making a lithiated silicon-based precursor material for a negative electrode material of an electrochemical cell that cycles lithium ions is provided. An admixture comprising a plurality of lithium particles and a plurality of silicon particles is briquetted by applying pressure of greater than or equal to about 10 MPa and applying heat at a temperature of less than or equal to about 180° C. to form a precursor briquette. The briquette has lithium particles and silicon particles distributed in a matrix and has a porosity level of less than or equal to about 60% of the total volume of the precursor briquette. The briquetting is conducted in an environment having less than or equal to about 0.002% by weight of any oxygen-bearing species or nitrogen ($N_2$).

16 Claims, 2 Drawing Sheets

(56) References Cited

U.S. PATENT DOCUMENTS

| | | |
|---|---|---|
| 9,005,811 B2 | 4/2015 | Xiao et al. |
| 9,093,705 B2 | 7/2015 | Xiao et al. |
| 9,142,830 B2 | 9/2015 | Xiao et al. |
| 9,302,914 B2 | 4/2016 | Liu et al. |
| 9,362,551 B2 | 6/2016 | Sachdev et al. |
| 9,379,374 B2 | 6/2016 | Liu et al. |
| 9,531,004 B2 | 12/2016 | Xiao et al. |
| 9,564,639 B2 | 2/2017 | Huang |
| 9,570,752 B2 | 2/2017 | Huang et al. |
| 9,577,251 B2 | 2/2017 | Xiao et al. |
| 9,780,361 B2 | 10/2017 | Xiao et al. |
| 10,062,898 B2 | 8/2018 | Xiao |
| 10,164,245 B2 | 12/2018 | Huang |
| 10,854,882 B2 | 12/2020 | Halalay et al. |
| 10,950,846 B2 | 3/2021 | Xiao et al. |
| 10,985,363 B2 | 4/2021 | Xiao et al. |
| 2018/0205114 A1 | 7/2018 | Pauric et al. |
| 2020/0020948 A1 | 1/2020 | Huang et al. |
| 2020/0020949 A1 | 1/2020 | Huang |
| 2020/0119339 A1 | 4/2020 | Halalay et al. |
| 2021/0175486 A1 | 6/2021 | Cain et al. |

OTHER PUBLICATIONS

Xiao, Xingcheng et al., U.S. Appl. No. 16/239,027, filed Jan. 3, 2019 entitled "Method for in Situ Growth of Axial Geometry Carbon Structures in Electrodes," 38 pages.

Xiao, Xingcheng et al., U.S. Appl. No. 16/239,040, filed Jan. 3, 2019 entitled "Electrodes and Methods of Fabricating Electrodes for Electrochemical Cells By Continuous Localized Pyrolysis," 58 pages.

Cain, Jeffrey D. et al., U.S. Appl. No. 16/706,331, filed Dec. 6, 2019 entitled, "Methods of Lithiating Electroactive Materials," 50 pages.

METHODS OF BRIQUETTING PRECURSOR MATERIALS FOR PRELITHIATED SILICON ACTIVE MATERIALS

INTRODUCTION

This section provides background information related to the present disclosure which is not necessarily prior art.

The present disclosure pertains to methods of making a lithiated silicon-based precursor material by briquetting that can be used to form a negative electroactive material for use in an electrochemical cell that cycles lithium ions. The present disclosure also provides precursor briquettes formed therefrom.

Lithium ion batteries can be used in a variety of consumer products and vehicles. Silicon-based negative electrochemically active materials can be used in a negative electrode or anode for such batteries. Silicon has the highest known theoretical charge capacity for lithium and thus provides high specific capacity (in comparison with conventional graphite), making it one of the most promising materials for rechargeable lithium ion batteries. However, current silicon-based negative electrode materials can potentially suffer from certain drawbacks. For example, during an initial lithiation and delithation cycle, the silicon-based electroactive material can undergo excessive volumetric expansion and contraction. Moreover, the initial lithiation process of silicon-based electroactive materials can promote an increase in surface roughness.

Additional volumetric changes may also occur during successive charging and discharging cycles for silicon electroactive materials. Such volumetric changes can lead to fatigue cracking and decrepitation of the electroactive material. This may potentially lead to a loss of electrical contact between the silicon-containing electroactive material and the rest of the battery components, as well as the consumption of electrolyte to form new solid electrolyte interface (SEI), resulting in a decline of electrochemical cyclic performance, diminished Coulombic efficiency, charge capacity retention (increased capacity fade), and limited cycle life. This is especially true at relatively high loading levels required for the application of silicon containing electrodes in high-energy lithium ion batteries, such as those used in transportation applications.

Typically, silicon-based electroactive materials are incorporated into the negative electrode that is incorporated into the battery, which is subsequently lithiated by cycling the battery. Thus, the silicon-based electroactive material may suffer from one or more of the issues during the initial lithiation cycle discussed above. Prelithiation of silicon-based electroactive materials before they are incorporated into the negative electrode in a battery can minimize some of the shortcomings described above. For example, most of the physical changes that occur during lithiation, such as volumetric expansion and increase in surface roughness have already occurred.

However, prelithiation can prove to be challenging in view of the different densities, melting points, and boiling points of lithium (Li) and silicon (Si), respectively. Thus, mixing of molten lithium and molten silicon frequently results in gravitational separation and evaporation of lithium during melting and casting. It would be desirable to develop manufacturing processes to form precursors for forming prelithiated silicon-based electroactive materials that address these challenges and enable efficient prelithiation of silicon-containing electroactive materials.

SUMMARY

This section provides a general summary of the disclosure, and is not a comprehensive disclosure of its full scope or all of its features.

The present disclosure relates to a method of making a lithiated silicon-based precursor material for a negative electrode material of an electrochemical cell that cycles lithium ions. The method may include briquetting an admixture including a plurality of lithium particles and a plurality of silicon particles. The briquetting includes applying pressure of greater than or equal to about 10 MPa and applying heat at a temperature of less than or equal to about 180° C. to form a precursor briquette. The precursor briquette includes the plurality of lithium particles and the plurality of silicon particles distributed in a matrix having a porosity level of less than or equal to about 60% of the total volume of the precursor briquette. The briquetting is conducted in an environment having less than or equal to about 0.002% by weight of any oxygen-bearing species and nitrogen ($N_2$).

In one aspect, the precursor briquette includes the plurality of lithium particles at greater than or equal to about 20% by weight to less than or equal to about 70% by weight of the precursor briquette and the plurality of silicon particles present at greater than or equal to about 30% by weight to less than or equal to about 80% by weight of the precursor briquette.

In one aspect, the plurality of lithium particles has a first average particle size diameter and the plurality of silicon particles has a second average particle size diameter. The first average particle size diameter is two to five times greater than the second average particle size diameter.

In one aspect, the temperature is greater than or equal to about 50° C. to less than or equal to about 180° C.

In one aspect, the admixture further includes a plurality of binder particles that form the matrix after the briquetting. The plurality of binder particles have a melting point of less than about 180° C.

In one aspect, the plurality of binder particles includes a material selected from the group consisting of: sodium (Na), polyvinylidene fluoride (PVDF), polyamides, polyolefins, polyethers, and combinations thereof.

In one further aspect, the plurality of lithium particles has a first average particle size diameter, the plurality of silicon particles has a second average particle size diameter, and the plurality of binder particles has a third average particle size diameter. The first average particle size diameter is two to five times greater than the second average particle size diameter and the third average particle size diameter is one to five times greater than the second average particle size diameter.

In one further aspect, the precursor briquette includes the plurality of lithium particles at greater than or equal to about 20% by weight to less than or equal to about 70% by weight of the precursor briquette, the plurality of silicon particles at greater than or equal to about 30% by weight to less than or equal to about 50% by weight of the precursor briquette, and the plurality of binder particles at greater than or equal to about 5% by weight to less than or equal to about 20% by weight of the precursor briquette.

In one aspect, the precursor briquette includes the plurality of lithium particles and the plurality of silicon particles homogeneously distributed therein.

In one aspect, the precursor briquette can be processed to form a plurality of electroactive particles including an alloy of lithium and silicon represented by a formula $Li4.4_xSi$, where x is greater than 0 to less than or equal to about 0.85.

In one further aspect, the alloy includes a phase selected from the group consisting of: $Li_{22}Si_5$, $Li_{13}Si_4$, $Li_7Si_3$, $Li_{12}Si_7$, LiSi, Si, and combinations thereof.

In one aspect, the alloy forms a particle defining a shell region and a core region. A compositional gradient of lithium is defined between the shell region and the core region, where the shell region has a higher concentration of lithium.

In one aspect, the plurality of lithium particles and the plurality of silicon particles independently have a shape selected from the group consisting of: round particles, spheres, rods, strips, fibers, irregular shapes, and combinations thereof.

In one aspect, the plurality of lithium particles has a first average particle size diameter of greater than or equal to about 100 μm to less than or equal to about 50 mm and the plurality of silicon particles has a second average particle size diameter of greater than or equal to about 50 μm to less than or equal to about 10 mm and the plurality of silicon particles.

In one aspect, the plurality of lithium particles has a first average particle size diameter of greater than or equal to about 2 mm and the plurality of silicon particles has a second average particle size diameter of greater than or equal to about 1 mm.

In one aspect, the precursor briquette has an actual density of greater than or equal to about 70% of a theoretical density of the precursor briquette.

In one aspect, the pressure is greater than or equal to about 10 MPa and less than or equal to about 1 GPa.

The present disclosure also relates to a method of making a negative electrode material for an electrochemical cell that cycles lithium ions. The method may include melting a precursor briquette including a plurality of lithium particles and a plurality of silicon particles distributed in a matrix and having a porosity level of less than or equal to about 60% of the total volume of the precursor briquette to form a molten precursor including silicon and lithium. The molten precursor is solidified to form a plurality of solid electroactive particles including an alloy of lithium and silicon capable of being incorporated into a negative electrode of the electrochemical cell.

In one aspect, the alloy of lithium and silicon is represented by a formula Li4.4xSi, where x is greater than 0 to less than or equal to about 0.85.

The present disclosure also relates to a precursor briquette for a lithiated silicon-based electroactive material. The precursor briquette may include a plurality of lithium particles at greater than or equal to about 20% by weight and a plurality of silicon particles at greater than or equal to about 30% by weight homogeneously distributed in a matrix and having a porosity level of less than or equal to about 30% of the total volume of the precursor briquette. The precursor briquette is capable of forming an alloy of lithium and silicon represented by a formula $Li_{4.4}xSi$, where x is greater than 0 to less than or equal to about 0.85.

In one aspect, the plurality of lithium particles is present at greater than or equal to about 20% by weight to less than or equal to about 70% by weight of the precursor briquette, the plurality of silicon particles is present at greater than or equal to about 30% by weight to less than or equal to about 50% by weight of the precursor briquette, and the matrix is present at greater than or equal to about 5% by weight to less than or equal to about 20% by weight of the precursor briquette.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
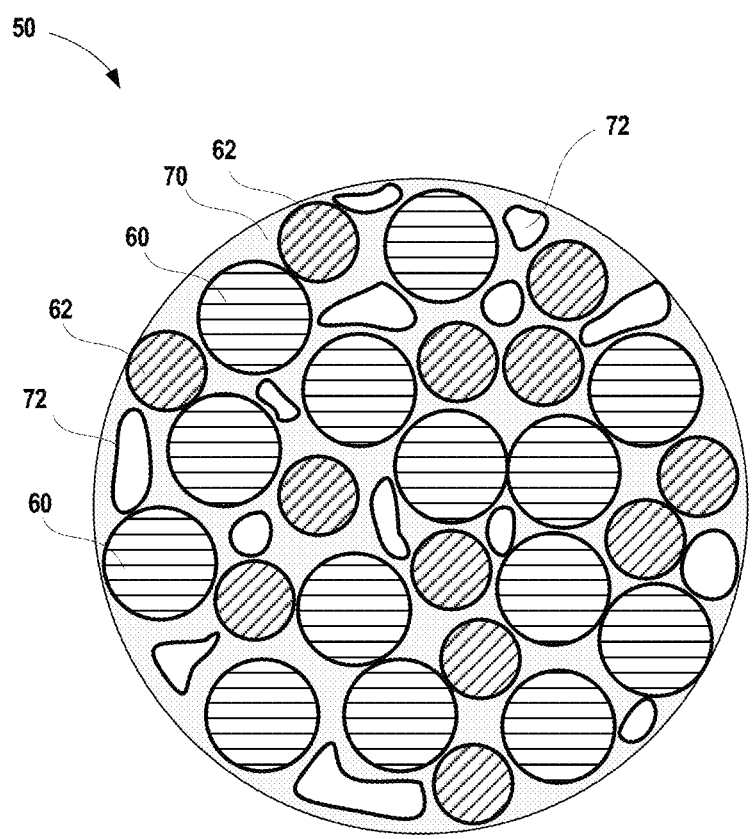
FIG. 1 is an illustration of a cross-section of a briquette including lithium particles and silicon particles that can be used as a precursor to make a lithiated-silicon containing negative electroactive material for an electrochemical cell that cycles lithium ions prepared according to certain aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of" Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

In various aspects, methods of making a lithiated silicon-based precursor material for a negative electrode material of an electrochemical cell that cycles lithium ions are provided. The methods may include briquetting an admixture that comprises a plurality of lithium particles and a plurality of silicon particles. The briquetting may occur by applying pressure to the admixture of particles, for example, a pressure of greater than or equal to about 10 MPa at a temperature of less than or equal to about 180° C. to form a precursor briquette. Further, the briquetting is conducted in an environment having less than or equal to about 0.002% by weight of any oxygen-bearing species or nitrogen ($N_2$). The precursor briquette comprises the plurality of lithium particles and the plurality of silicon particles distributed in a matrix. The precursor briquette may have a porosity level of less than or equal to about 60% of the total volume of the precursor briquette.

In this manner, the methods provided by certain aspects of the present disclosure involving a briquetting process address the gravity separation and evaporation of molten materials during melting and casting that otherwise occurs due to the different densities and melting temperatures of silicon and lithium. For example, the melting point or melting temperature of silicon is higher than the boiling point or boiling temperature of lithium. In the past, gravity separation would result in floating of a molten lithium lump and lithium evaporation could occur during conventional melting and casting of lithium alloys. The process of briquetting of solid precursor powders can address such difficulties that otherwise could be attendant with conventional melting and casting processes for making of Li—Si alloys. The briquettes can be used as precursor materials for forming negative electrode electroactive materials.

FIG. 1 shows a briquette 50 made by a briquetting process that may form a lithiated silicon-based precursor material for a negative electrode material of an electrochemical cell that cycles lithium ions. In FIG. 1, the briquette 50 includes a plurality of lithium particles 60 and a plurality of silicon particles 62. A matrix 70 of the briquette 50 has the lithium particles 60 and the silicon particles 62 distributed therein. In certain aspects, the matrix 70 may optionally be formed of lithium that is softened or melted to form a bulk region that surrounds and retains other solid lithium particles 60 and solid silicon particles 62. In other aspects, the matrix 70 is formed of a third material, as will be described further below, in which the plurality of lithium particles 60 and the plurality of silicon particles 62 are distributed therein. In certain variations, the plurality of lithium particles 60 and the plurality of silicon particles 62 may be homogeneously distributed in the matrix 70 of the briquette 50.

A plurality of open pores 72 may remain within the matrix 70 of the briquette 50 after briquetting, as well. In certain aspects, the briquette 50 may be compressed by application of pressure and/or heat during the briquetting process so that it forms a compressed monolithic briquette (e.g., a tablet or pellet) that may have a porosity level of less than or equal to about 60% of the total volume of the precursor briquette, optionally less than or equal to about 50% of the total volume of the precursor briquette, optionally less than or equal to about 40% of the total volume of the precursor briquette, and in certain variations, optionally less than or equal to about 30% of the total volume of the precursor briquette. In certain variations, the briquette 50 can have an actual density that is greater than or equal to about 70% of the maximum theoretical density. The actual density of the briquette 50 is optionally greater than or equal to about 75%, optionally greater than about 80% of the theoretical maximum density, and in certain variations, optionally greater than about 85% of the theoretical maximum density when compressed into a briquette.

In certain aspects, the briquette 50 may comprise the plurality of lithium particles 60 at greater than or equal to about 20% by weight to less than or equal to about 70% by weight of the briquette 50. In certain other aspects, the briquette 50 may comprise the plurality of silicon particles 62 present at greater than or equal to about 30% by weight to less than or equal to about 80% by weight of the briquette 50 and optionally at greater than or equal to about 30% by weight to less than or equal to about 50% by weight. The briquette 50 may comprise the plurality of lithium particles 60 optionally present at greater than or equal to about 30% by weight to less than or equal to about 75% by weight of the briquette, the plurality of silicon particles 62 optionally present at greater than or equal to about 30% by weight to less than or equal to about 50% by weight of the briquette 50, and the matrix 70 present at greater than or equal to about 5% by weight to less than or equal to about 20% by weight of the briquette 50.

The plurality of lithium particles 60 may have a first average particle size diameter, while the plurality of silicon particles 62 may have a second average particle size diameter. The first average particle size diameter of the lithium particles 60 may be two to five times greater than the second average particle size diameter of the silicon particles 62. For example, where the first average particle size diameter of the plurality of lithium particles 60 is about 1 mm, the second average particle size diameter of the plurality of silicon particles 62 may be from about 200 µm to 500 µm. In certain variations, the plurality of lithium particles 60 has a first average particle size diameter of greater than or equal to about 100 µm to less than or equal to about 50 mm and the plurality of silicon particles 62 has a second average particle size diameter of greater than or equal to about 50 µm to less than or equal to about 10 mm. Notably, larger sized particles may be used in such a process, for example, particles with an average diameter in excess of 1 mm. In one aspect, the plurality of lithium particles 60 has a first average particle size diameter of greater than or equal to about 2 mm and the plurality of silicon particles 62 has a second average particle size diameter of greater than or equal to about 1 mm.

The plurality of lithium particles 60 and the plurality of silicon particles 62 may independently have a shape selected from the group consisting of: round particles, spheres, rods, strips, fibers, irregular shapes, and combinations thereof.

In certain variations, the briquette 50 is formed from a precursor admixture that may include a plurality of binder particles that form the matrix 70 after the briquetting process. The plurality of binder particles may have a melting point of less than about 180° C. As noted above, in certain variations, the binder particles may be provided as a stoichiometric excess of lithium particles, so that select lithium particles melt or soften during the briquetting process to form the matrix 70 comprising lithium. Lithium metal can thus act as both a lithium precursor and a glue during heat-assisted briquetting. Other metals or polymers with lower melting and boiling points, such as sodium (Na) and polymers (polyvinylidene fluoride (PVDF), polyamides, polyolefins, polyethers) can also be used as a glue in the briquetting process. Sodium will evaporate during subsequent melting processes that occur. Polymers will decompose into carbon during subsequent heating, which can enhance the electrical conductivity of the final products that can be advantageous for use as an electroactive material in an electrochemical cell.

Thus, in certain variations, the plurality of binder particles may comprise a third material selected from the group consisting of: sodium (Na), polyvinylidene fluoride (PVDF), polyamides, polyolefins, polyethers, and combinations thereof. Where the binder is formed by a third material, the plurality of lithium particles is optionally present at greater than or equal to about 20% by weight to less than or equal to about 70% by weight of the briquette, the plurality of silicon particles is present at greater than or equal to about 30% by weight to less than or equal to about 50% by weight of the briquette, and the matrix formed by the plurality of binder particles is present at greater than or equal to about 5% by weight to less than or equal to about 20% by weight of the precursor briquette.

The plurality of binder particles may have a third average particle size diameter as compared to the second average particle size diameter of the plurality of silicon particles 62. The third average particle size diameter of the binder particles may be one to five times greater than the second average particle size diameter of the silicon particles 62. For example, where the third average particle size diameter of the plurality of binder particles is about 1 mm, the second average particle size diameter of the plurality of silicon particles 62 may be from about 200 µm to 1 mm. In certain variations, the plurality of binder particles has the third average particle size diameter of greater than or equal to about 50 µm to less than or equal to about 50 mm. The plurality of binder particles having the third average particle size diameter may be greater than or equal to about 1 mm.

Table 1 shows intrinsic properties for some representative materials that can be used to form the briquettes prepared in accordance with certain aspects of the present disclosure.

TABLE 1

| Material | Density (g/cm$^3$) | Melting point (° C./K) | Boiling point (° C./K) |
| --- | --- | --- | --- |
| Li | 0.534 | 180.5/453.7 | 1342/1603 |
| Si | 2.329 | 1414/1687 | 3265/3538 |
| Na | 0.968 | 97.8/370.9 | 882.9/1156.1 |
| PVDF | 1.78 | 177/450 | — |

In certain aspects, a briquette 50 can be a precursor briquette that can be further processed to form an electroactive material for a negative electrode of an electrochemical cell that cycles lithium ions. For example, the precursor briquette can be subsequently processed to form a plurality of electroactive particles comprising an alloy of lithium and silicon. In certain variations, the alloy of lithium and silicon may be represented by a formula $Li_{4.4x}Si$, where x is greater than 0 to less than or equal to about 0.85. In certain aspects, the alloy formed from the precursor briquette may comprise a phase selected from the group consisting of: $Li_{22}Si_5$, $Li_{13}Si_4$, $Li_7Si_3$, $Li_{12}Si_7$, LiSi, Si, and combinations thereof. The relative amounts of the lithium particles and the silicon particles selected for inclusion in the briquette can dictate the stoichiometry of the lithium-silicon alloy later formed. By way of example, if the targeted end product for a prelithiated silicon-containing electroactive material is $Li_{22}Si_5$ (also often referred to as $Li_{4.4}Si$), the composition of the briquette can be close to lithium at about 52 wt. % and silicon at about 48 wt. % (neglecting the amount of matrix present in the briquette). If a different targeted electroactive negative material is $Li_7Si_3$ for example, less lithium is required and the product will have more air-stability. Thus, the composition of the briquette can be approximately lithium at 37 wt. % and silicon at 63 wt. % active materials, again exclusive of the matrix material. Notably, as an amount of lithium in the briquette decreases, the structural integrity of the green body briquette may be diminished and therefore, additional binder may be added to meet handling requirements in such circumstances.

In certain aspects, the present disclosure further contemplates a method of making a negative electrode material for an electrochemical cell that cycles lithium ions. The method may include melting a precursor briquette comprising a plurality of lithium particles and a plurality of silicon particles distributed in a matrix and having a porosity level of less than or equal to about 60% of the total volume of the precursor briquette to form a molten precursor comprising silicon and lithium. It should be noted that after the briquettes are formed, in the process of subsequently melting the briquettes, molten lithium advantageously wets and dissolves solid silicon before reaching the melting point of silicon and the boiling point of lithium. The lithium particles are distributed in the densified green body briquette and bound therein, thus due to thermodynamics, lithium and silicon tend to melt together rather than the lithium undergoing phase separation. In this manner, the present technology reduces gravity separation and evaporation of molten materials, especially of lithium, to increase the homogeneity of lithium-silicon alloys formed. Moreover, briquetting is also believed to provide a superior homogeneity in the final lithiated silicon alloy ($Li_xSi$) product. Depending on the hold time for the melting process, a compositional gradient from the outside to the inside of the particle may be created. There may be a lithium rich exterior or shell (e.g., having a different crystallographic phase) and a lithium depleted center or core with a greater amount of silicon (e.g., a different phase and crystal structure in the core compared to that in the shell or outer portion). Thus, the lithiated silicon alloy ($Li_xSi$) alloy forms an electroactive particle defining a shell region and a core region, where a compositional gradient of lithium is defined between the shell region and the core region, such that the shell region has a higher concentration of lithium.

The molten precursor may be solidified to form a plurality of solid electroactive particles comprising an alloy of lithium and silicon capable of being incorporated into a negative electrode of the electrochemical cell. By way of example, one such method of making lithiated silicon containing electroactive materials via a centrifugal atomization spraying process is described in co-owned U.S. patent application Ser. No. 16/706,351 filed on Dec. 6, 2019 entitled "Methods of Forming Prelithiated Silicon Alloy Electroactive Materials," the relevant portions of which are incorporated herein by references in its entirety.

The present disclosure also contemplates a precursor briquette for a lithiated silicon-based electroactive material, such as any of those variations described above. In one example, the precursor briquette comprises a plurality of lithium particles present at greater than or equal to about 20% by weight to less than or equal to about 70% by weight and a plurality of silicon particles at greater than or equal to about 30% by weight to less than or equal to about 80% by weight. The plurality of lithium particles and the plurality of silicon particles may be homogeneously distributed in a matrix. The precursor briquette may have a porosity level of less than or equal to about 60% of the total volume of the precursor briquette. The precursor briquette is capable of forming an alloy of lithium and silicon represented by a formula $Li_{4.4x}Si$, where x is greater than 0 to less than or equal to about 0.85.

Figure 2:
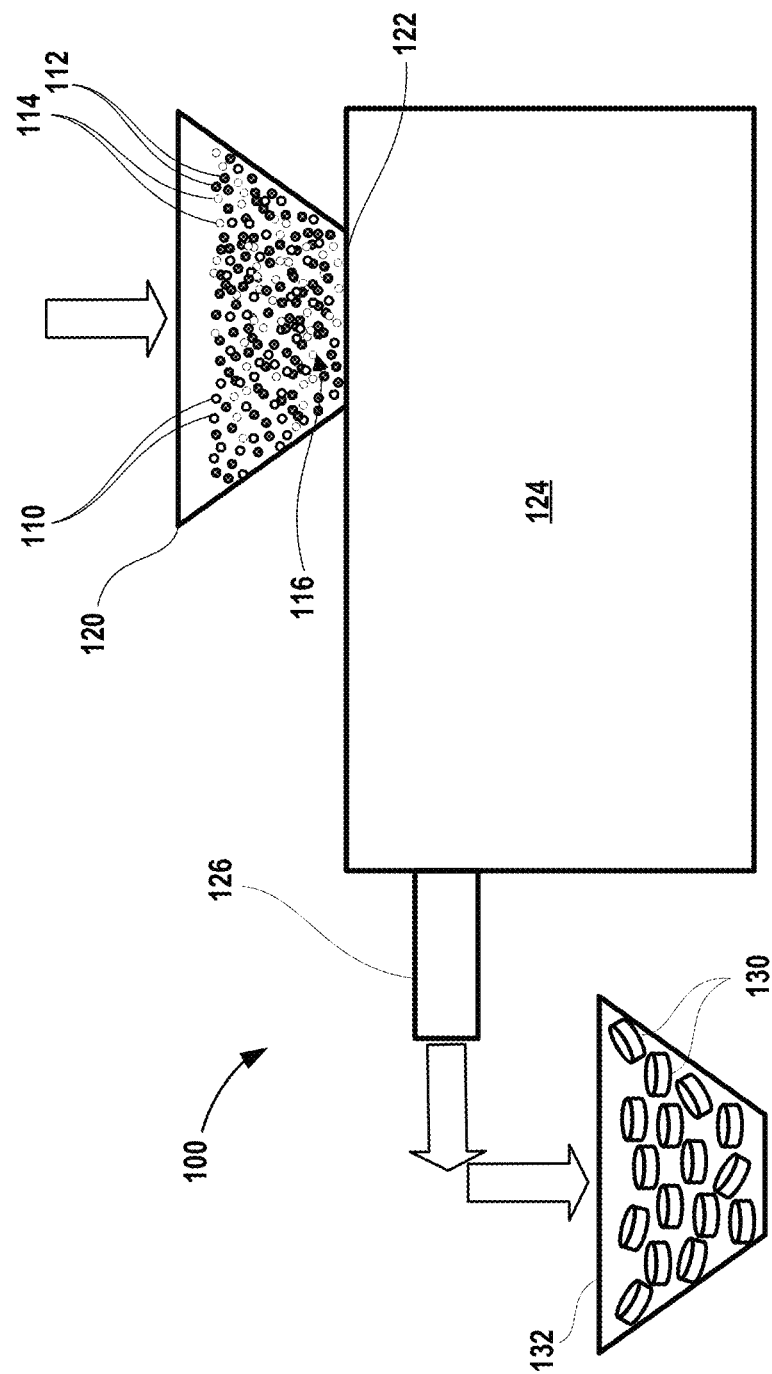
FIG. 2 is an illustration of an example of a briquetting machine that can be used to form briquettes that can be used as a precursor to make a lithiated-silicon containing negative electroactive material for an electrochemical cell that cycles lithium ions prepared according to certain aspects of the present disclosure.

FIG. 2 shows a briquetting device 100 for conducting such a briquetting process. A plurality of silicon particles 110, a plurality of lithium particles 112, and a plurality of optional binder particles 114 are introduced to a hopper 120 of the briquetting device 100. The plurality of silicon particles 110, the plurality of lithium particles 112, and the plurality of optional binder particles 114 may be mixed prior to introduction into the hopper 120 or mixed within the hopper 120 to form an admixture 116. Notably, the processing of the plurality of silicon particles 110, a plurality of lithium particles 112, and a plurality of optional binder particles 114 is conducted in an environment having less than or equal to about 0.002% by weight of any oxygen-bearing species or nitrogen ($N_2$). For example, the environment may have less than or equal to about 0.002% by weight of any oxygen-bearing species in a gas phase, for example, oxygen gas, water vapor, carbon dioxide, and the like and optionally less than or equal to about 0.0002% of any oxygen-bearing species. The presence of oxygen-containing species, such as oxygen ($O_2$) or water ($H_2O$) may cause undesirable formation of lithium hydroxide (LiOH) or in the case of the presence of carbon dioxide ($CO_2$), lithium carbonate ($Li_2CO_3$) may undesirably be formed. Further, the presence of $N_2$ in the atmosphere during processing can promote formation of lithium nitride ($LiN_3$) Thus, the environment during the processing has less than or equal to about 0.002% by weight of nitrogen and optionally less than or equal to about 0.0002% of nitrogen. Likewise, the environment in the briquetting device 100 may optionally have a low water/moisture level reflected by a relative humidity (RH) of less than or 0.002% at reaction condition temperatures and optionally less than or equal to about 0.0002% of water/moisture level. By way of example, mixing and processing may be conducted in an inert atmosphere, such as in an argon atmosphere.

The precursor materials, namely the plurality of silicon particles 110, a plurality of lithium particles 112, and a plurality of optional binder particles 114 are in a dry powder and/or pulverized particulate form. The hopper 120 is in communication with an inlet 122 of the briquetting chamber 124, where the admixture 116 of particles flows into and through the briquetting chamber during the briquetting process. Thus, pressure is applied to the admixture 116 of particles, for example, by a hydraulic system within the briquetting chamber 124 (not shown). The dry powders may be compressed with applied forces greater than or equal to about 10 MPa to less than or equal to about 1 GPa, optionally greater than or equal to about 50 MPa to less than or equal to about 900 MPa, optionally greater than or equal to about 75 MPa to less than or equal to about 750 MPa, optionally greater than or equal to about 100 MPa to less than or equal to about 500 MPa.

Further, the admixture 116 may also be heated (by a heater in the briquetting chamber 124, not shown). In certain aspects, the temperature in the briquetting chamber may be greater than or equal to about 50° C. to less than or equal to about 180° C. Thus, the precursor materials in the admixture 116 are transferred into the briquetting chamber 124, where they are processed by applying pressure and heat while under argon protection. The heat-assisted briquetting (at temperatures up to about 180° C.) facilitates formation of a binder or glue that defines a matrix in which the active material particles of lithium and silicon are distributed.

After being subjected to compression and heating within the briquetting chamber 124, an elongated compressed green body material is formed from the precursors in the admixture 116. The elongated compressed green body may be cut to form individual briquettes 130 that exit the briquetting chamber 124 via an outlet 126. As shown, the briquettes 130 are in a disc shape, although other shapes are contemplated. The dimensions of the briquettes 130 are not limiting, but may be suitable for requirements during subsequent processing to form an electroactive material. For example, in the case of processing the precursor briquettes 130 via a centrifugal atomization process, a non-limiting representative diameter of the briquettes in the form of discs could range from greater than or equal to about 1 cm to less than or equal to about 100 cm and a height of the greater than or equal to about 0.5 cm to less than or equal to about 50 cm. However, as noted above, the shape and dimensions of the briquette can be adjusted as necessary for ease of fabrication/handling, cost, and subsequent process requirements. The briquettes 130 may be collected in a vessel 132 and may have the composition and properties discussed above in the context of FIG. 1.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of making a lithiated silicon-based precursor material for a negative electrode material of an electrochemical cell that cycles lithium ions, the method comprising:

briquetting an admixture comprising a plurality of lithium particles and a plurality of silicon particles by applying pressure of greater than or equal to about 10 MPa and applying heat at a temperature of greater than ambient temperature to less than or equal to about 180° C. to form a precursor briquette comprising the plurality of lithium particles and the plurality of silicon particles distributed in a matrix having a porosity level of less than or equal to about 60% of the total volume of the precursor briquette, wherein the briquetting is conducted in an environment having less than or equal to about 0.002% by weight of any oxygen-bearing species and nitrogen ($N_2$).

2. The method of claim 1, wherein the precursor briquette comprises the plurality of lithium particles at greater than or equal to about 20% by weight to less than or equal to about 70% by weight of the precursor briquette and the plurality of silicon particles present at greater than or equal to about 30% by weight to less than or equal to about 80% by weight of the precursor briquette.

3. The method of claim 1, wherein the plurality of lithium particles has a first average particle size diameter and the plurality of silicon particles has a second average particle size diameter, wherein the first average particle size diameter is two to five times greater than the second average particle size diameter.

4. The method of claim 1, wherein the temperature is greater than or equal to about 50° C. to less than or equal to about 180° C.

5. The method of claim 1, wherein the admixture further comprises a plurality of binder particles that form the matrix after the briquetting, wherein the plurality of binder particles have a melting point of less than about 180° C.

6. The method of claim 5, wherein the plurality of binder particles comprises a material selected from the group consisting of: sodium (Na), polyvinylidene fluoride (PVDF), polyamides, polyolefins, polyethers, and combinations thereof.

7. The method of claim 5, wherein the plurality of lithium particles has a first average particle size diameter, the plurality of silicon particles has a second average particle size diameter, and the plurality of binder particles has a third average particle size diameter, wherein the first average particle size diameter is two to five times greater than the second average particle size diameter and the third average particle size diameter is one to five times greater than the second average particle size diameter.

8. The method of claim 5, wherein the precursor briquette comprises the plurality of lithium particles at greater than or equal to about 20% by weight to less than or equal to about 70% by weight of the precursor briquette, the plurality of silicon particles at greater than or equal to about 30% by weight to less than or equal to about 50% by weight of the precursor briquette, and the plurality of binder particles at greater than or equal to about 5% by weight to less than or equal to about 20% by weight of the precursor briquette.

9. The method of claim 1, wherein the precursor briquette comprises the plurality of lithium particles and the plurality of silicon particles homogeneously distributed therein.

10. The method of claim 1, wherein the precursor briquette can be processed to form a plurality of electroactive particles comprising an alloy of lithium and silicon represented by a formula $Li_{4.4x}Si$, where x is greater than 0 to less than or equal to about 0.85.

11. The method of claim 10, wherein the alloy comprises a phase selected from the group consisting of: $Li_{22}Si_5$, $L_{13}Si_4$, $Li_7Si_3$, $Li_{12}Si_7$, LiSi, Si, and combinations thereof.

12. The method of claim 10, wherein the alloy forms a particle defining a shell region and a core region, wherein a compositional gradient of lithium is defined between the shell region and the core region, where the shell region has a higher concentration of lithium.

13. The method of claim 1, wherein the plurality of lithium particles and the plurality of silicon particles independently have a shape selected from the group consisting of: round particles, spheres, rods, strips, fibers, irregular shapes, and combinations thereof and the plurality of lithium particles has a first average particle size diameter of greater than or equal to about 100 µm to less than or equal to about 50 mm and the plurality of silicon particles has a second average particle size diameter of greater than or equal to about 50 µm to less than or equal to about 10 mm.

14. The method of claim 1, wherein the plurality of lithium particles has a first average particle size diameter of greater than or equal to about 2 mm and the plurality of silicon particles has a second average particle size diameter of greater than or equal to about 1 mm.

15. The method of claim 1, wherein the precursor briquette has an actual density of greater than or equal to about 70% of a theoretical density of the precursor briquette.

16. The method of claim 1, wherein the pressure is greater than or equal to about 10 MPa and less than or equal to about 1 GPa.

\* \* \* \* \*